April 30, 1946.  C. A. NICHOLSON  2,399,244
ARRESTING MECHANISM FOR AIRCRAFT
Filed Jan. 10, 1938  2 Sheets-Sheet 2
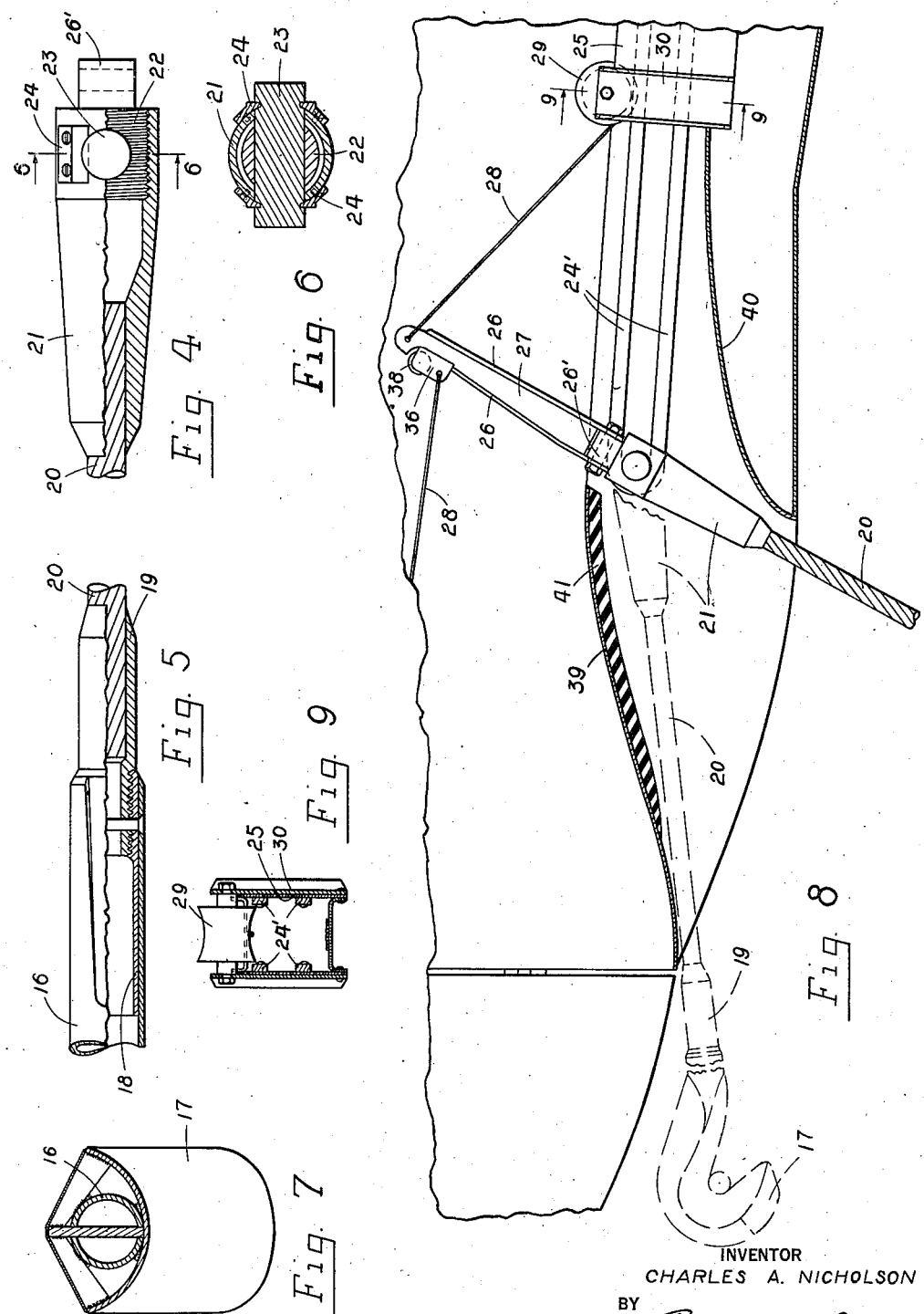
INVENTOR
CHARLES A. NICHOLSON
BY
ATTORNEY Patented Apr. 30, 1946

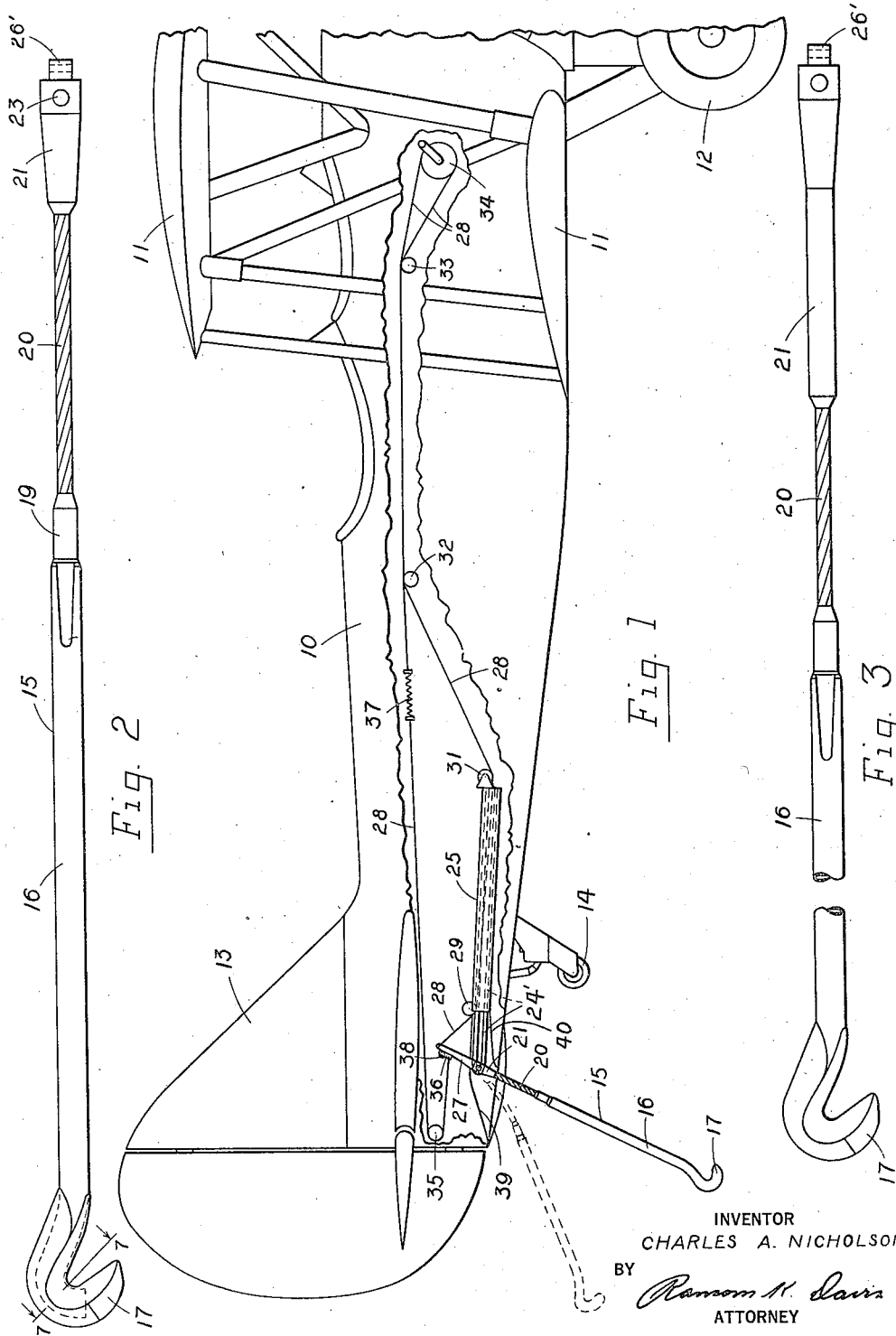

2,399,244

UNITED STATES PATENT OFFICE 2,399,244

ARRESTING MECHANISM FOR AIRCRAFT

Charles A. Nicholson, United States Navy

Application January 10, 1938, Serial No. 184,142

2 Claims. (Cl. 244—110)

(Granted under the act of March 3, 1883, as amended April 30, 1928; 370 O. G. 757)

The present invention relates to an arresting mechanism for aircraft and it has a particular relation to an arresting hook carried by an airplane for engagement with a ground cable and means for releasing and retrieving the hook while the airplane is in flight.

One of the objects of the invention is the provision of a new and improved arresting hook of the character described having a flexible shank portion for preventing the hook from whipping when released and for yieldably holding the hook in position to engage the arresting rope or cable on the ground.

Another object of the invention is the provision of mechanism on the aircraft for quickly and easily releasing the hook and for retrieving the same and housing it aboard the aircraft.

With these and other objects in view, as well as other advantages that may be incident to the use of the improvements, the invention consists in the parts and combinations thereof hereinafter set forth and claimed, with the understanding that the several necessary elements constituting the same may be varied in proportion and arrangement without departing from the nature and scope of the invention, as defined in the appended claims.

In order to make the invention more clearly understood, there are shown in the accompanying drawings, means for carrying the invention into practical use, without limiting the improvements in their useful application to the particular construction, which, for the purpose of explanation, have been made the subject of illustration.

In the accompanying drawings:

Fig. 1 is a fragmentary diagrammatic view of an airplane equipped with the improved arresting mechanism, the hook being shown in full lines in a position to engage the arresting ground cable and by broken lines in the position it assumes after contact therewith;

Fig. 2 is an enlarged side elevational view of one form of an arresting hook constructed in accordance with the invention;

Fig. 3 is a similar view, with a part broken away, of another form of hook embodying the invention;

Fig. 4 is an enlarged fragmentary view partly in side elevation and partly in vertical longitudinal section of the upper end of the shank portion of the hook;

Fig. 5 is a similar view of the lower end of the shank portion of the hook;

Fig. 6 is a vertical transverse sectional view of the hook taken on line 6—6 of Fig. 4;

Fig. 7 is an enlarged transverse sectional view of the hook taken on line 7—7 of Fig. 2;

Fig. 8 is an enlarged longitudinal sectional view of a portion of the releasing and retrieving mechanism shown in Fig. 1; and Fig. 9 is a transverse sectional view taken on line 9—9 of Fig. 8.

Referring to the drawings, and particularly to Fig. 1 thereof, an arresting hook and mechanism for releasing and retrieving the same, constructed in accordance with the present invention, is shown as being installed in an airplane comprising in its essentials, a fuselage 10, wings 11, landing wheels 12, empennage 13 and tail wheel 14. The arresting hook indicated generally at 15 preferably comprises a tubular shank 16 having a cable engaging hook 17, welded or otherwise, secured to its lower end. An internally screw-threaded sleeve 18 (Fig. 5) is suitably secured within the upper end of the shank 16 and is adapted to receive one end of a tubular lower terminal fitting 19 which is swaged around one end of a section of flexible metallic cable 20. The other end of the cable section 20 is secured, preferably by swaging, within the lower end of an upper terminal fitting 21 having an enlarged upper end within which a plug 22 is screw threaded. A trunnion shaft 23 extends through the fitting 21 and plug 22 projecting a short distance outwardly on opposite sides thereof and is maintained against displacement therefrom by keepers 24 which are secured to the fittings 21 for interlocking engagement with the shaft 23 (Figs. 4 and 6). The projecting ends of the shaft 23 are mounted for pivotal and slidable movement between spaced longitudinally extending guide rails 24' which are secured to the inner surfaces of the opposite walls of a tunnel or housing 25 and which extend outwardly a short distance therefrom. The portions of the guide rails 24' disposed outside of the tunnel 25 are of metallic construction but those portions that are disposed within the tunnel are preferably constructed from a phenolic condensation product, such as "micarta" or some other light weight self-lubricating material.

The screw plug 22 is formed with an outwardly extending ear 26' to which a lever in the form of two substantially parallel straps 26 and an intermediate bar 27 is pivotally mounted. A cable 28 is secured at one end to the upper end of the bar 27 and extends forwardly beneath a pulley 29 journaled in brackets 30 secured to the rear end of the tunnel 25, thence through the tunnel, thence beneath a pulley 31 mounted adjacent to the forward end of the tunnel, thence upwardly and over a double pulley 32, thence over a double pulley 33 and around a crank operated drum 34 located within access of the pilot, thence rearwardly over the pulleys 33 and 32 and around an extreme rear pulley 35 and thence again forwardly and is secured at its other end to a bracket 36 on the lever bar 27. A spring 37 is preferably inserted in the cable 28 in order to maintain the cable taut and to take up any slack that may develop.

Assuming that the hook is released from the cable of the ground gear, as illustrated by the full lines in Figs. 1 and 9, the pilot can retrieve the hook by turning the crank operated pulley 34 in a clockwise direction, thus first swinging the hook about shaft 23 to approximately the position shown by the broken lines in Fig. 8. Continued rotation of the pulley 34 will draw the hook into the tunnel 25, the shaft 23 and the keepers 24 sliding along the guides 24', the keepers 24 preventing lateral displacement. A roller 38 is mounted in the bracket 36 to facilitate the entry of the hook device into the tunnel 25. The rear end of the tunnel 25 terminates in upper and lower skirt portions 39 and 40 respectively, which form a portion of the fuselage, and a pad 41 of rubber or the like is preferably secured to the former to minimize shock when the hook swings upwardly.

The device hereinabove described may be modified in construction and arrangement of the parts by those skilled in the art without departing from the invention as defined in the appended claims.

The invention described herein may be manufactured and/or used by or for the Government of the United States of America for governmental purposes without the payment of any royalties thereon or therefor.

What I claim as new is:

1. A device for arresting the motion of an aircraft when landing comprising a tubular housing adapted to be mounted within the fuselage of the aircraft, track means disposed within said housing and extending longitudinally thereof, a hook for engagement with the cable of a ground gear and having a shank provided with means located intermediate its ends for slidably and pivotally engaging said track, and means for sliding said hook into and out of said housing and for swinging it about its pivot when extended, said shank having a yieldable portion of substantially less length than the over-all length of the shank for minimizing the rebound of the hook upon contact with the ground.

2. A device for arresting the motion of an aircraft when landing comprising a tubular housing adapted to be mounted within the fuselage of the aircraft, track means disposed within said housing and extending longitudinally thereof, a hook for engagement with the cable of a ground gear and having a shank provided with trunnions located intermediate its ends for slidably and pivotally engaging said track, and cable means for sliding said hook into and out of said housing and for swinging it on said trunnions when extended, said housing having a flared after end for guiding said shank into said housing when said hook is retracted and said shank having a flexible portion of substantially less length than the over-all length of the shank for minimizing the rebound of the hook upon contact with the ground.

CHARLES A. NICHOLSON.